(12) United States Patent
Fujimoto et al.

(10) Patent No.: US 9,645,026 B2
(45) Date of Patent: *May 9, 2017

(54) TIGHTENING DEVICE

(71) Applicants: TONE CO., LTD., Osaka (JP); Fuji Jukogyo Kabushiki Kaisha, Tokyo (JP)

(72) Inventors: Katsuhiro Fujimoto, Osaka (JP); Toshihiko Kushida, Osaka (JP); Tatsuo Hirai, Shiga (JP); Yukio Torigai, Osaka (JP); Tatsuo Nakahata, Tokyo (JP); Manabu Saito, Tokyo (JP); Masao Watanabe, Tokyo (JP)

(73) Assignees: TONE CO., LTD., Osaka (JP); FUJI JUKOGYO KABUSHIKI KAISHA, Tokyo (JP)

( * ) Notice: Subject to any disclaimer, the term of this patent is extended or adjusted under 35 U.S.C. 154(b) by 59 days.

This patent is subject to a terminal disclaimer.

(21) Appl. No.: 14/522,877

(22) Filed: Oct. 24, 2014

(65) Prior Publication Data

US 2015/0114138 A1 Apr. 30, 2015

(30) Foreign Application Priority Data

Oct. 31, 2013 (JP) ................................. 2013-227520

(51) Int. Cl.
*B25B 23/14* (2006.01)
*G01L 5/24* (2006.01)
(Continued)

(52) U.S. Cl.
CPC .............. *G01L 5/24* (2013.01); *B25B 23/147* (2013.01); *B60B 29/006* (2013.01)

(58) Field of Classification Search
CPC ........ G01L 5/24; B25B 23/147; B60B 29/006
(Continued)

(56) References Cited

U.S. PATENT DOCUMENTS

| | | | |
|---|---|---|---|
| 7,770,658 B2* | 8/2010 | Ito ......................... | B23P 19/066 173/1 |
| 2003/0173178 A1* | 9/2003 | Sasaki ..................... | B25B 21/02 192/3.51 |

(Continued)

FOREIGN PATENT DOCUMENTS

| | | |
|---|---|---|
| DE | 32 30 642 A1 | 2/1984 |
| JP | 2013-166211 A | 8/2013 |
| WO | 2011/122361 A1 | 10/2011 |

OTHER PUBLICATIONS

European Patent Office, "extended European search report for EP 14 19 0722", Apr. 10, 2015, 6 pp.

*Primary Examiner* — Max Noori
(74) *Attorney, Agent, or Firm* — Eckert Seamans; Grant Coffield; David Jenkins

(57) ABSTRACT

A tightening device is able to check that a fastening member has been fastened to a desired set torque or greater after being tightened, without loosening the fastening member. The tightening device is provided with a mode switching switch for switching between a first tightening process of adjusting the output of a motor after measured torque that is measured by a torque detector has reached a preset first control start torque, such that the measured torque reaches a preset first set torque in a phased manner through repeated increases and decreases in torque, and blocking power supply to the motor when the measured torque reaches the first set torque, and a second tightening process of driving the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in (Continued)

torque, and blocking power supply to the motor when the measured torque reaches the second set torque.

3 Claims, 4 Drawing Sheets

(51) Int. Cl.
    *B25B 23/147*     (2006.01)
    *B60B 29/00*     (2006.01)

(58) Field of Classification Search
    USPC ............................... 73/761, 862.21, 862.23
    See application file for complete search history.

(56) References Cited

U.S. PATENT DOCUMENTS

| | | | |
|---|---|---|---|
| 2007/0163357 A1* | 7/2007 | Nakazawa | B25B 21/00 73/761 |
| 2011/0000688 A1* | 1/2011 | Iwata | B25B 21/00 173/1 |
| 2013/0008679 A1 | 1/2013 | Nishikawa et al. | |
| 2015/0122522 A1* | 5/2015 | Fujimoto | B60B 29/006 173/1 |

\* cited by examiner

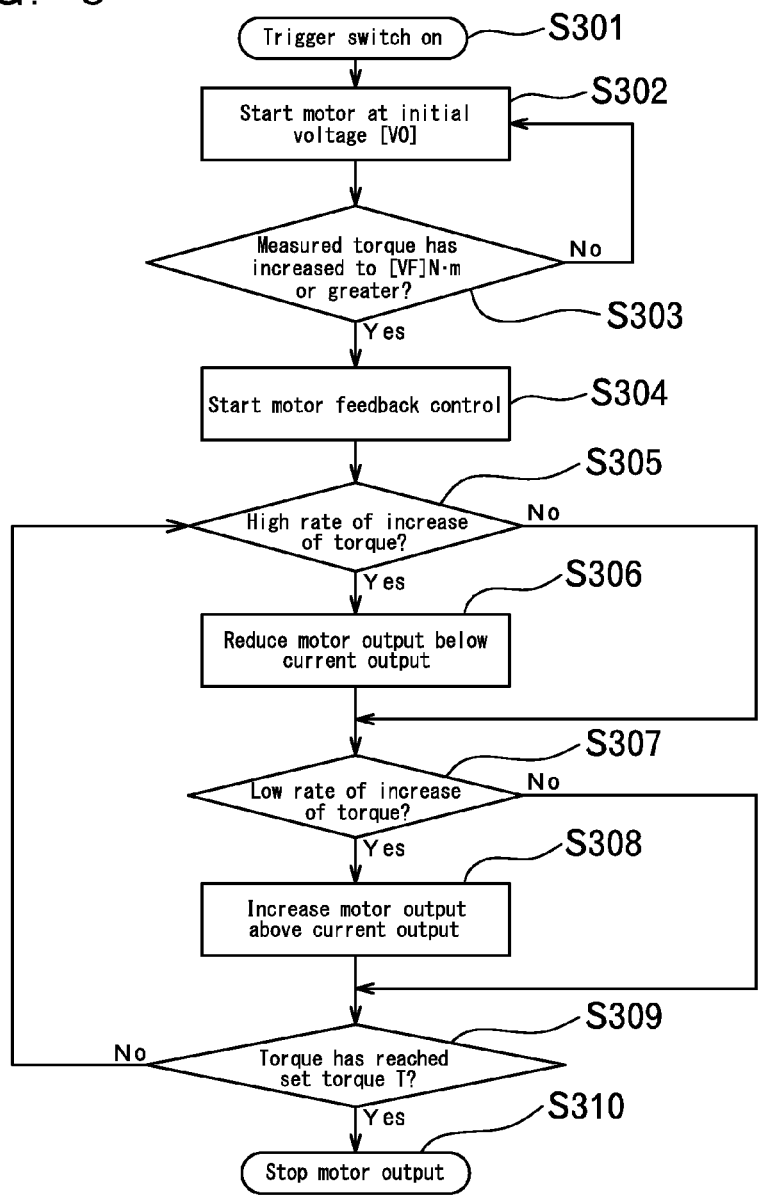

F I G. 7
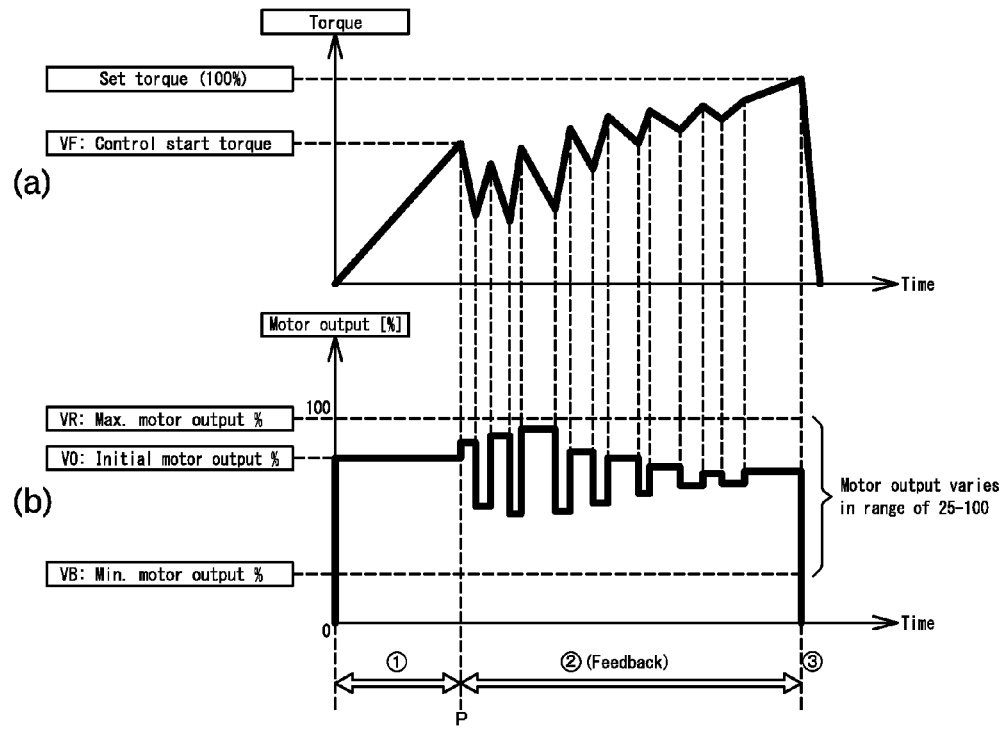
F I G. 8
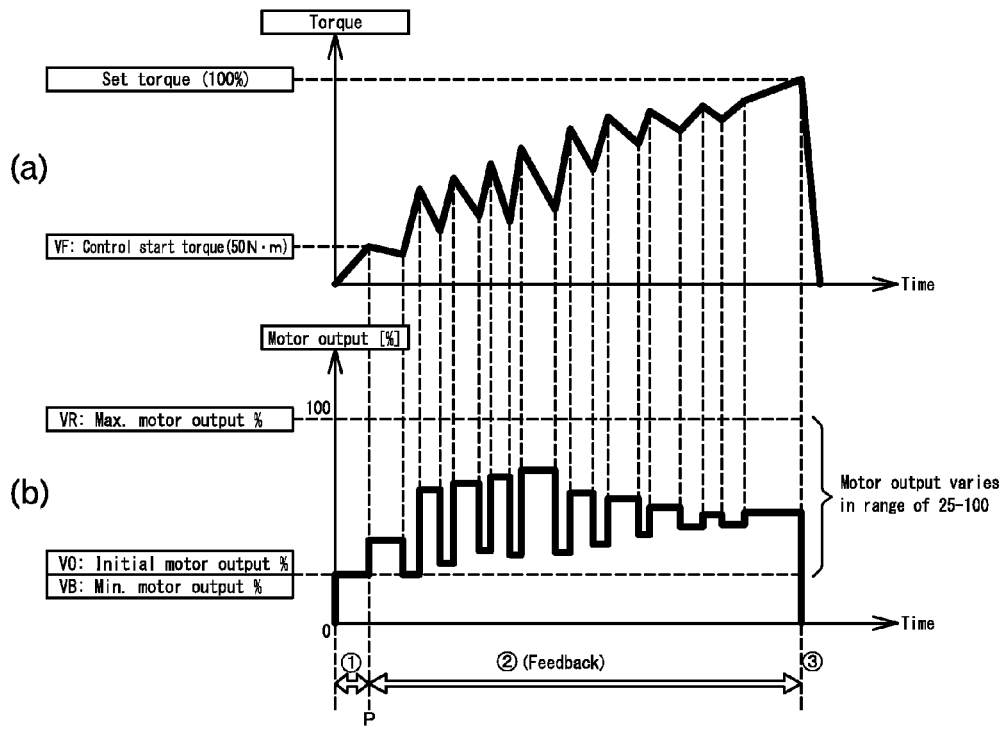

US 9,645,026 B2

TIGHTENING DEVICE

BACKGROUND OF THE INVENTION

1. Field of the Invention

The present invention relates to a tightening device that is able to tighten a fastening member such as a bolt or a nut using a plurality of tightening processes.

2. Description of the Related Art

In order to increase the accuracy with which fastening members such as bolts or nuts are tightened, a known tightener measures the tightening torque that acts on the fastening member, and is numerically controlled to end the tightening when the measured torque reaches a set torque (e.g., see JP 2013-166211A).

Also, additional tightening that involves torque being further applied to tighten a fastening member that has already been tightened is performed in some cases (see JP 2013-166211A).

There is a need for a way of checking whether tightening has actually been performed to a desired set torque or greater, after a fastening member has been tightened or after additional tightening has been performed.

In tightening the wheel nuts of a vehicle, the wheel nuts are firstly tightened and run in, and then loosened and tightened again in order to check whether tightening has been performed to a prescribed set torque. Further running in thus needs to be performed when wheel nuts that have already been tightened once are loosened and retightened, making it difficult to determine whether the tightening torque has really reached the set torque.

An object of the present invention is to provide a tightening device that is able to check that a fastening member has been fastened to a desired set torque or greater after being tightened, without loosening the fastening member.

SUMMARY OF THE INVENTION

In order to solve the above problems, a tightening device of the present invention is a tightening device including a motor, a motor drive circuit that drives the motor, a drive shaft that is rotated by the motor, has a socket mounted on a tip thereof, and is configured to tighten a fastening member, a torque detector that detects a tightening torque that acts on the socket, and a control unit that controls the motor drive circuit based on a set torque set in advance and a measured torque measured by the torque detector. The control unit includes a motor switching switch that switches between a first tightening process of controlling the motor drive circuit, adjusting an output of the motor after the measured torque that is measured by the torque detector has reached a preset first control start torque, such that the measured torque reaches a preset first set torque in a phased manner through repeated increases and decreases in torque, and blocking power supply to the motor when the measured torque reaches the first set torque, and a second tightening process of controlling the motor drive circuit to drive the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in torque, and blocking power supply to the motor when the measured torque reaches the second set torque.

The mode switching switch desirably has a display unit that enables the mode that has been switched to, out of the first tightening process and the second tightening process, to be visually checked.

Effects of the Invention

According to the tightening device of the present invention, the tightening mode can be changed to shift to a second tightening process by operating a mode switching switch, after a fastening member has been tightened in a first tightening process with a first setting torque as the target value. In the second tightening process, a motor is driven at an initial output that is less than the initial output in the first tightening process, and tightening is implemented with a second set torque as the target value. By performing this second tightening process, it can be confirmed that the fastening member is tightened to at least the second set torque.

The second tightening process is able to prevent over-tightening, or so-called overshooting, with respect to the second set torque, since the initial output of the motor is less than in the first tightening process, and tightening is performed by increasing the torque in a phased manner through repeated increases and decreases in torque.

Also, because it can be visually checked which tightening process is the residing tightening process when the mode switching switch is operated, erroneous operation can be prevented.

BRIEF DESCRIPTION OF THE DRAWINGS

FIG. 5 is a flowchart showing a set torque changing flow of a tightening device according to one embodiment of the present invention.

FIG. 6 is a flowchart showing a tightening flow of a tightening device according to one embodiment of the present invention.

FIG. 7 is a graph showing the change in tightening torque in a tightening mode of a first tightening process, and a graph showing the change in motor output.

FIG. 8 is a graph showing the change in tightening torque in a tightening mode of a second tightening process, and a graph showing the change in motor output.

DESCRIPTION OF THE PREFERRED EMBODIMENTS

Figure 1:
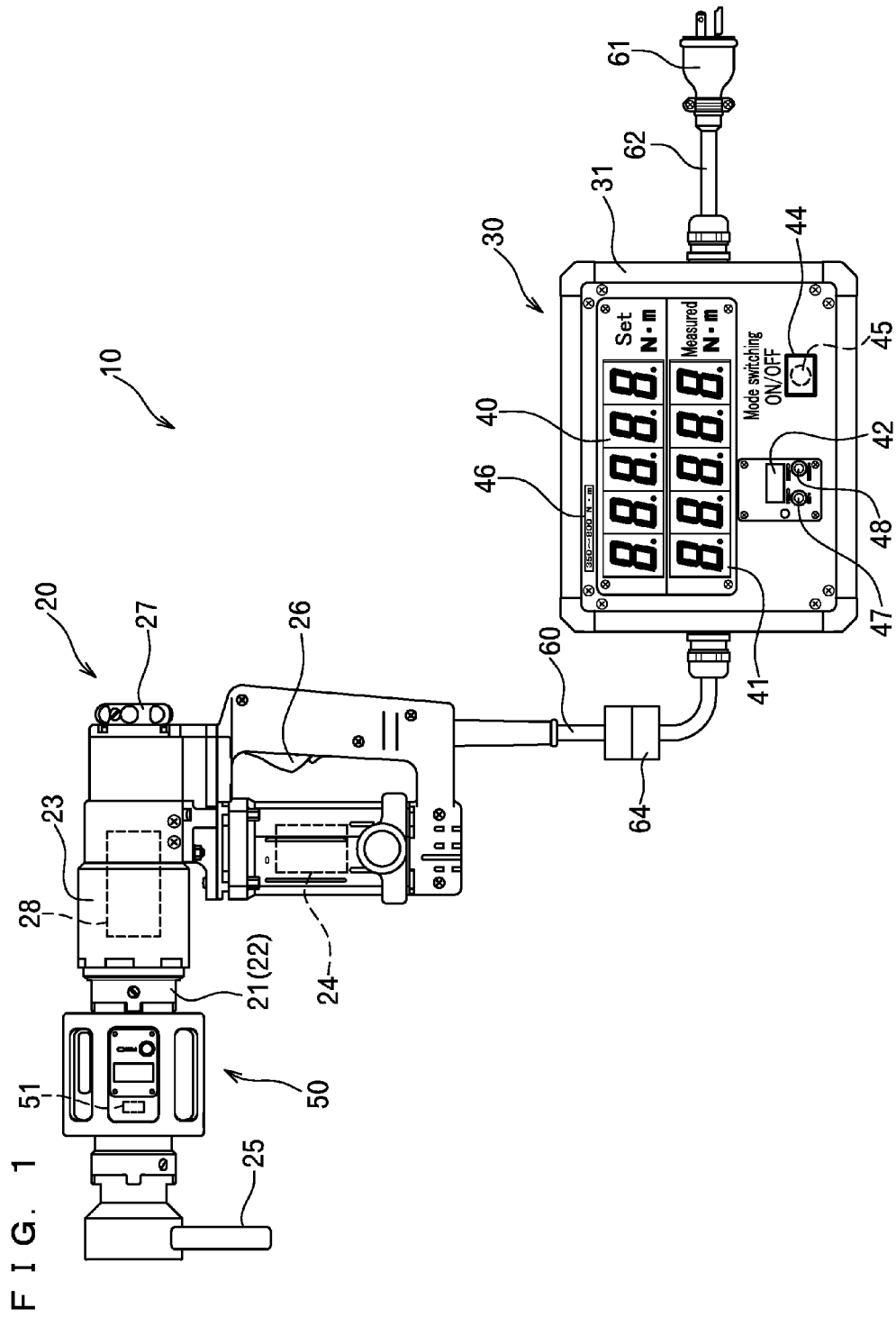
FIG. 1 is a schematic diagram illustrating a tightening device according to one embodiment of the present invention.
Figure 2:
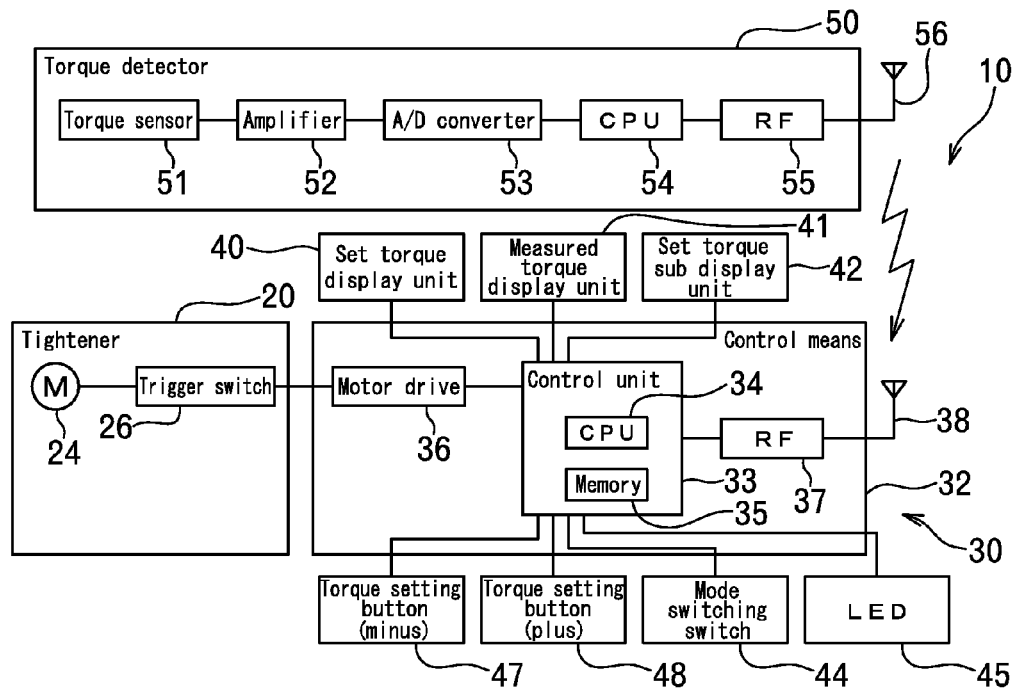
FIG. 2 is a block diagram of a tightening device according to one embodiment of the present invention.

Hereinafter, an embodiment in which a tightening device 10 of the present invention is applied to a numerically controlled tightening device constituted by a tightener 20 serving as a main body that performs the tightening, a control device 30 that controls the tightener 20, and a torque detector 50 that measures torque, as shown in FIGS. 1 and 2, will be described. Note that a configuration can also be adopted in which some or all of the functions of the control device 30 are incorporated in the tightener 20, or some of the functions of the control device 30 may be executed by an external PC or the like.

Figure 3:
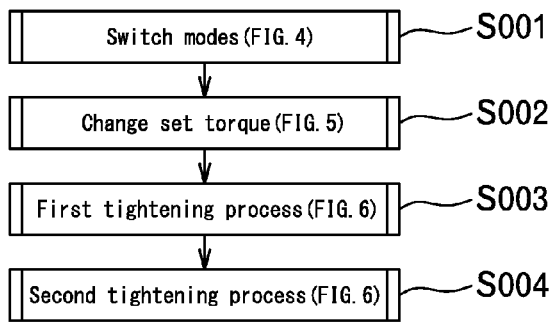
FIG. 3 is a flowchart showing the overall flow of a tightening method according to one embodiment of the present invention.

Also, in the following embodiment, the tightening process consists of a first tightening process and a second tightening process as shown in FIG. 3, with the first tightening process being a normal tightening mode, and the second tightening process serving as a checking tightening mode that can check whether the tightening torque is a set torque or greater.

FIG. 1 is a diagram illustrating an outline of the tightening device 10 of the present invention, and FIG. 2 is a schematic block diagram of the tightening device 10. As shown in the diagrams, the tightening device 10 is constituted by the tightener 20 and the control device 30, and the tightener 20 is provided with the torque detector 50 which detects torque acting on a socket.

Tightener 20

In the embodiment shown in FIG. 1, a double-shaft power wrench in which a drive shaft 21 consists of an inner shaft and an outer shaft 22 is exemplified as the tightener 20. However, the power wrench is not limited to a double-shaft power wrench and may be a single-shaft power wrench, and the tightener 20 may be an impact wrench, an impact driver, an impact/hammer drill, or the like.

In the double-shaft tightener 20, the inner shaft and the outer shaft 22 forming the drive shaft 21 can be rotated in opposite directions to each other by a motor 24 built into a housing 23. The inner shaft and the outer shaft 22 can be connected to the motor 24 by a deceleration mechanism 28 such as a planetary gear mechanism.

The tightener 20 is provided, at a tip of the inner shaft, with a socket that is capable of mounting a fastening member such as a bolt or a nut. Also, a reaction receiver 25 that is equipped with an arm whose tip projects in a substantially perpendicular direction relative to the axial center of the drive shaft 21 is attached to a tip of the outer shaft 22.

The tightener 20, on receiving an instruction from a control device 30 shown in FIG. 2 as a result of a trigger switch 26 shown in FIG. 1 being operated, drives the motor 24 and rotates the drive shaft 21. Also, as shown in FIG. 1, the tightener 20 is equipped with a switch 27 for forward-reverse switching, and the rotation of the motor 24 can be reversed by operating the switch 27 for forward-reverse switching to enable tightening and loosening of a fastening member. The switch 27 for forward-reverse switching can be given as a switch that switches the rotation of the drive shaft 21 between forward and reverse mechanistically, through a gear change, clutch operation or the like of the deceleration mechanism 28. Also, the switch 27 for forward-reverse switching may be a switch that reverses the voltage that is supplied to the motor 24.

Torque Detector 50

The tightener 20 is equipped with the torque detector 50 for detecting the torque acting on the socket. The torque detector 50 transmits a signal relating to torque to the control device 30. As shown in FIG. 1, a torque detector in which a torque sensor 51 that detects tightening torque is directly mounted between the drive shaft 21 and the socket can be employed as the torque detector 50. The torque acting on the socket may be torque detected from a change in the electrical system of the tightener 20, such as the change in motor current, for example. Also, the torque acting on the socket may also be obtained through conversion from the rotation angle of the drive shaft 21, the motor 24, the deceleration mechanism 28 or the like.

Because the torque detector 50 rotates in tandem with the drive shaft 21 when mounted in the drive shaft 21 as shown in FIG. 1, cable connection with the control device 30 is not possible. Accordingly, it is desirable that the signal relating to tightening torque measured by the torque sensor 51 is amplified by an amplifier circuit 52, input to the CPU 54 after undergoing A/D conversion in an A/D converter circuit 53, and wirelessly transmitted via a RF (Radio Frequency) circuit 55 and an antenna 56, as shown in FIG. 2. Power supply to the torque detector 50 can be performed by installing a small battery in the torque detector 50.

As a specific embodiment, a distortion gauge adhered to the outer shaft 22 can be exemplified as the torque sensor 51. The tightening torque acting on the outer shaft 22 is output as a voltage change caused by the resistance change of the distortion gauge.

Control Device 30

The control device 30 is, as shown in FIG. 1, electrically connected to the tightener 20 by a connection cable 60, and is capable of communicating with the tightener 20 and supplying power to the tightener 20. Note that the control device 30 needs to perform setting and adjustment according to the performance and characteristics of the tightener 20. Accordingly, erroneous measurement or the like may occur when a different tightener 20 is connected to the control device 30. Thus, it is desirable for the connection cable 60 to directly couple the tightener 20 to the control device 30 in an undetachable manner. Note that a configuration may be adopted in which the tightener 20 and the control device 30 are connected by a connector 64, with the length of the connector 64 being selectable according to the work environment.

The control device 30 can, furthermore, be connected to a commercial power source by a power cable 62 that has a plug 61 connected to a tip thereof.

As a specific embodiment, the control device 30 incorporates a control means 32 shown in FIG. 2 in a box-type casing 31, as shown in FIG. 1. The control means 32 is provided with a control unit 33 that is mainly constituted by electronic components including a CPU 34, a memory 35 such as RAM or ROM, and a D/A converter, and can be realized by various programs or the like stored in the memory 35. In FIG. 2, a functional block relating to typical functions that are realized by these connections is depicted. It should naturally be understood that these functional blocks can be realized using only hardware, only software, or a combination of hardware and software.

A set torque display unit 40 that displays a set torque that is desired by a user, and a measured torque display unit 41 that displays the tightening torque measured by the torque detector 50 are provided on one surface of the casing 31, as shown in FIG. 1. Also, torque setting buttons 47 and 48 for the user to increase or decrease the set torque, and a mode switching switch 44 for switching between the tightening modes of a first tightening process and a second tightening process are provided. Furthermore, a torque setting range display unit 46 that indicates the range over which the set torque of the tightening device 10 can be set is provided on the casing 31.

A digital display employing LEDs, for example, can be used for the set torque display unit 40 and the measured torque display unit 41. One or both of these display units can, in the case where an anomaly of some kind occurs in the tightening device 10, be used as an error display unit for displaying the anomaly. Note that, in FIG. 1, reference numeral 42 denotes a set torque sub display unit that displays the set torque when the torque setting buttons 47 and 48 are operated, and is smaller than the set torque display unit 40.

The torque setting buttons 47 and 48 are a minus button 47 for reducing the set torque and a plus button 48 for increasing the set torque. These torque setting buttons 47 and 48 can also be used as error cancellation buttons by operating one of the buttons when an anomaly of some kind occurs in the tightening device 10.

The mode switching switch 44 is a switch for switching between two different tightening modes, and a press button switch, a dial switch, a slide switch or the like can be employed therefor. A display unit that displays the residing tightening mode is disposed in a suitable place in the mode switching switch 44 or on the casing 31, so as to enable the tightening mode to which the mode switching switch 44 is set to be visually checked. In the illustrated example, an LED 45 that is illuminated in correspondence with one of the tightening mode is disposed in the display unit. The integrated LED 45 is illuminated when the mode switching switch 44 that is illustrated is set to one of the tightening modes (the second tightening process in the present embodiment). It is conceivable, for example, to display the residing tightening mode on the abovementioned measured torque display unit 41 or the like, and to switch this display when tightening is started, although, in this case, the tightening mode cannot be checked while tightening is being performed. Also, the user is required to perform other operations in order to check the tightening mode. On the other hand, in the present invention, the residing tightening mode can be visually checked as a result of the mode switching switch 44 itself being illuminated, which has the advantage of preventing erroneous operation and the like.

The torque setting range display unit 46 indicates the minimum and maximum set torque of the tightening device 10, as shown in FIG. 1. The setting range stamped into a plate as shown in FIG. 1 or printed on a sticker and attached to the casing 31 can be exemplified as the torque setting range display unit 46. A digital display can also be used therefor similarly to the above set torque display unit 40 and the like.

The control unit 33 constituting the control means 32 has, as shown in FIG. 2, the abovementioned display units 40, 41 and 42, buttons 47 and 78, and mode switching switch 44 connected thereto, together with a motor drive circuit 36 for driving the motor 24 of the tightener 20 via the trigger switch 26, and an RF circuit 37 and an antenna 38 for performing wireless communication with the torque detector 50. For example, output adjustment of the motor 24 by the motor drive circuit 36 can be performed by phase control or PWM control.

All programs for controlling the tightener 20 are stored in the memory 35. For example, stored in the memory 35 are set torques set by the user in correspondence with the respective tightening modes of the first tightening process and the second tightening process, tightening programs and various parameters corresponding to the respective tightening modes, the residing tightening mode, the control amount of the motor drive circuit 36 for adjusting the output of the motor 24 based on the measured torque that is received and the set torque, and the like.

Control of the tightening device 10 configured such as described above can be broadly divided, as shown in FIG. 3, into a mode switching flow (FIG. 4, step S001), a set torque changing flow (FIG. 5, step S002), and a tightening flow (FIG. 6) including the first tightening process (step S003) and the second tightening process (step S004).

Mode Switching Flow

The mode switching flow is a flow for switching between the first tightening process and the second tightening process.

Figure 4:
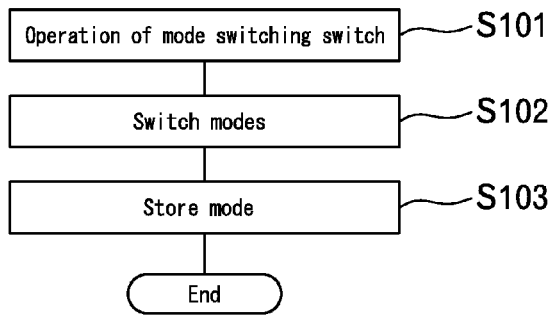
FIG. 4 is a flowchart showing a mode switching flow of a tightening device according to one embodiment of the present invention.

More specifically, as shown in FIG. 4, this involves processing for switching, when the mode switching switch 44 is operated (step S101), the residing tightening mode between the first tightening process and the second tightening process (step S102), and storing the residing tightening mode in the memory 35 of the control unit 33 (step S103). The tightening mode switched to by the mode switching switch 44 can be discriminated by referring to the LED 45. In the present embodiment, the LED 45 is turned off in the first tightening process and turned on in the second tightening process. Note that, in order to prevent erroneous operation, it is desirable to deactivate operation of the mode switching switch 44 during the set torque changing flow, the first tightening process and the second tightening process which will be discussed later.

Set Torque Changing Flow

The set torque changing flow (step S002) shown in FIG. 5 is performed after the mode switching flow (step S001) as shown in FIG. 3. This set torque changing flow is executed following the mode switching flow at the time of the initial setting of the tightening device 10 or in the case of changing the set torque of the respective tightening modes. In the present embodiment, the set torque (first set torque) of the first tightening process and the set torque (second set torque) of the second tightening process are set. In the case of using the tightening device 10 in a state where the set torque has already been set or changed, execution of the set torque changing flow can be skipped.

The set torque changing flow is for setting and storing the set torque for the residing tightening mode, when the torque setting buttons 47 and 78 are operated.

As a specific embodiment, when the torque setting button 47 or 48 is operated (step S201), the control unit 33 increments or decrements the set torque that is stored in the memory 35 by the designated value, according to the operation of the torque setting button 47 or 48 (step S202), as shown in FIG. 5. Processing for storing the new set torque in the memory 35 as the set torque is then performed (step S203).

Note that it is desirable to deactivate operation of the torque setting buttons 47 and 48 during the mode switching flow, the first tightening process and the second tightening process in order to prevent erroneous operation, and a configuration may also be adopted in which the processing moves to step S203 after waiting for the torque setting button 47 or 48 to subsequently be operated within a predetermined time period after the torque setting button 47 or 48 has been operated.

Tightening Process

After the set torque of each tightening mode has been set using the set torque changing flow (step S002), actual tightening process that depends on the selected tightening mode (step S003, step S004) follows, as shown in FIGS. 3 and 6.

Description of Tightening Modes

Here, an outline of the tightening modes of the first tightening process and the second tightening process according to one embodiment of the present invention will be described.

Although the values differ, in each tightening mode, as shown in FIGS. 7 and 8, the motor 24 is started at a predetermined initial output (V0) and maintains the initial output (V0). After the measured torque that is detected by the torque detector 50 has reached a predetermined control start torque (VF) (the first control start torque in the first tightening process, and the second control start torque in the second tightening process), the output of the motor 24 is feedback controlled based on the measured torque. In feedback control, the motor 24 is driven while adjusting the output within a predetermined range defined by a maximum output (VR) and a minimum output (VB) of the motor 24. The measured torque thereby increases in a phased manner through repeated increases and decreases in torque.

Power supply to the motor is then blocked when the measured torque reaches the set torque set in advance.

First Tightening Process

The first tightening process is a tightening mode in which the motor 24 has a large initial output.

In this tightening mode, the initial output (V0) of the motor 24, as shown in FIG. 7, is larger than in the tightening mode of the second tightening process which will be shown next (see FIGS. 7 and 8). Accordingly, there if a risk of the tightening torque overshooting if the first tightening process is executed in order to check whether a tightened fastening member is tightened to a predetermined torque or greater. On the other hand, because the motor 24 has a large initial output, there is an advantage in that tightening can be performed in a short time.

Second Tightening Process

The second tightening process is a tightening mode for checking whether the fastening member tightened in the abovementioned first tightening process is tightened to a predetermined torque or greater.

The second tightening process is a tightening mode in which the initial output (V0) of the motor 24, as shown in FIG. 8, is less than the first tightening process.

Thus, although the second tightening process takes longer to reach a predetermined set torque due to the low initial output (V0) of the motor 24 that is set, there is an advantage in that over-tightening (overshooting) can be prevented.

A more detailed control flow of the tightening modes is shown in FIG. 6. Note that although the first tightening process and the second tightening process are described together, when tightening a fastening member, first, the first tightening process of step S003 is executed, and then the second tightening process of step S004 is executed after tightening the fastening member to a predetermined set torque. Selection of these tightening modes is performed by operating the mode switching switch 44.

The tightening flow is started by turning on the trigger switch 26 in a state where the socket of the tightener 20 is fitted to the fastening member (step S301). With the tightener 20 shown in FIG. 1, the trigger switch 26 is turned on by the user pulling the trigger switch 26 with a finger.

When the trigger switch 26 is turned on (step S301), the control unit 33 controls power supply from the motor drive circuit 36 to the motor 24 according to the residing tightening mode and the set torque thereof with reference to the memory 35, and drives the motor 24 at the initial output (V0) (step S302). The reaction receiver 25 thereby rotates in the reverse direction to the tightening direction of the socket and contacts another fastening member or the like, and the fastening member starts being tightened by the socket.

The initial output (V0) is set to satisfy the following relationship, where VB is the minimum starting output of the motor 24: initial output of first tightening process>initial output of second tightening process≥VB. More favorable checking tightening can be performed when the initial output of the second tightening process coincides with or most nearly approximates the minimum starting output (VB).

When the motor 24 starts driving, the torque detector 50 detects the torque acting on the socket, and transmits the detected torque to the control means 32 as the measured torque. The motor is driven at the initial output (V0) until the measured torque reaches the prescribed control start torque (VF) corresponding to each tightening mode (No at step S303; range indicated by circled number 1 in FIGS. 7 and 8). When the measured torque reaches the prescribed control start torque (VF) (YES at step S303; P in FIGS. 7 and 8), motor feedback control is started (step S304; range indicated by circled number 2 in FIGS. 7 and 8). Note that prescribed torque (VF) can be set in correspondence with the tightening mode. The control start torque (VF) can be set respectively in the first tightening process (first control start torque) and the second tightening process (second control start torque), in which case: first control start torque (VF)≥second control start torque (VF). Desirably, the following relationship is satisfied: first control start torque (VF)>second control start torque (VF). For example, in FIGS. 7 and 8, the first control start torque is 0.7 times the set torque T (VF=T×0.7), and the second control start torque is VF=50 N·m (<T×0.5).

In the motor feedback control (step S304), as shown in FIGS. 7 and 8, in the case where the rate of increase of measured torque is greater than a predetermined value, based on the measured torque from the torque detector 50 (Yes in step S305), the control unit 33 performs control to reduce the power supply from the motor drive circuit 36 to the motor 24 (step S306), and if the rate of increase of measured torque is less than or equal to the predetermined value (No in step S305), the processing proceeds to the following step S307.

As shown in FIGS. 7 and 8, conversely, in the case where the rate of increase of measured torque from the torque detector 50 is less than a predetermined value (Yes in step S307), the control unit 33 performs control to increase the power supply from the motor drive circuit 36 to the motor 24 (step S308), and if the rate of increase of measured torque is greater than or equal to the predetermined value (No in step S307), the processing proceeds to the following step S309.

The feedback control (steps S305 to S308) is executed until the measured torque from the torque detector 50 reaches the set torque T set in correspondence with each of the tightening modes (No in step S309). When measured torque reaches the set torque T (Yes in step S309), the control unit 33 blocks the power supply from the motor drive circuit 36 to the motor 24, and stop the output of the motor 24 (step S310; circled number 3 in FIGS. 7 and 8).

A graph showing the change in tightening torque in the tightening flow corresponding to each tightening mode, and a graph showing the change in output of the motor 24 are respectively shown as A and B in FIGS. 7 and 8.

Referring to FIGS. 7 and 8, it can be seen that the measured torque increases approximately linearly in each of the tightening modes due to the initial output (V0) being applied, and then when the first control start torque or the second control start torque (VF) corresponding to the tightening mode is reached, the measured torque increases in a phased manner through repeated increases and decreases in torque, and approaches the set torque T.

Because the motor 24 has a large initial output in the first tightening process compared with the second tightening process, tightening can be performed in a short time, although at the risk of the tightening torque overshooting. In this case, the fastening member would be tightened to an even greater tightening torque if the first tightening process were implemented in the second tightening process which is for checking the tightening torque.

In the present invention, overshooting is unlikely to occur, because the tightening torque is checked in the checking tightening mode of the second tightening process in which the initial output (V0) of the motor 24 is less than in the first tightening process. Accordingly, it can be accurately confirmed that the fastening member is tightened to the set tightening torque or greater.

That is, when the second tightening process is implemented on a fastening member that was tightened to less than the set torque in the first tightening process, the tightening torque can be increased to the set torque. On the other hand, when the second tightening process is implemented on a fastening member that was tightened to the set torque or greater in the first tightening process, it can be confirmed that the fastening member is tightened to the set torque or greater, without further increasing or loosening the tightening torque.

Being able to check that tightening has been performed to the set torque or greater in the second tightening process, without loosening the fastening member, is highly effective when applied to the tightening of wheel nuts, which was conventionally performed by loosening and retightening the wheel nuts.

The foregoing description is intended to illustrate the present invention, and should not be construed as limiting the invention defined in the claims or as restricting the scope of the invention. Also, the configuration of each element of the invention is not limited to the foregoing examples, and various modifications can be made within the technical scope of the claims.

For example, the first tightening process and the second tightening process can also be executed continuously on each fastening member, or the first tightening process may firstly be executed on a plurality of fastening members, and the second tightening process may then be executed collectively on these fastening members. Also, a configuration may be adopted in which only the second tightening process is executed on a fastening member tightened by another tightening device.

What is claimed is:

1. A tightening device comprising:
   a motor;
   a motor drive circuit that drives the motor;
   a drive shaft that is rotated by the motor, has a socket mounted on a tip thereof, and is configured to tighten a fastening member;
   a torque detector that detects a tightening torque that acts on the socket; and
   a control unit that controls the motor drive circuit based on a set torque set in advance and a measured torque measured by the torque detector,
   wherein the control unit includes a motor switching switch that switches between a first tightening process of controlling the motor drive circuit, adjusting an output of the motor after the measured torque that is measured by the torque detector has reached a preset first control start torque, such that the measured torque reaches a preset first set torque in a phased manner through repeated increases and decreases in torque, and blocking power supply to the motor when the measured torque reaches the first set torque, and a second tightening process of controlling the motor drive circuit to drive the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in torque, and blocking power supply to the motor when the measured torque reaches the second set torque.

2. The tightening device according to claim 1, wherein the mode switching switch has a display unit that enables the mode that has been switched to, out of the first tightening process and the second tightening process, to be visually checked.

3. The tightening device according to claim 2, wherein the display unit of the mode switching switch is illuminated in a state where one of the modes has been switched to.

* * * * *